Sept. 20, 1960 W. W. BROWN ET AL 2,953,366
GRATE BAR FOR PALLET OF SINTERING MACHINE
Filed Sept. 12, 1958 5 Sheets-Sheet 1
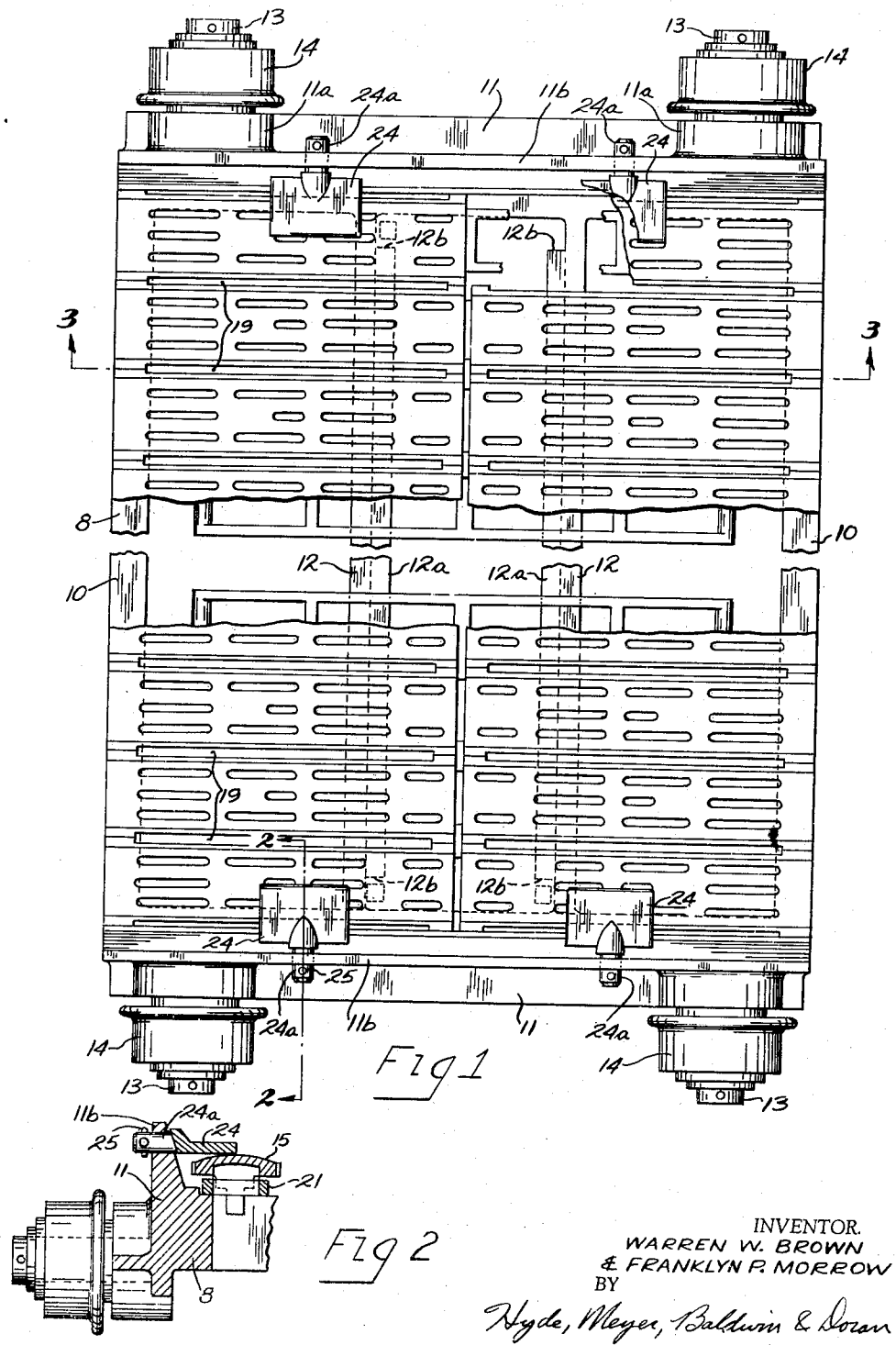
INVENTOR.
WARREN W. BROWN
& FRANKLYN P. MORROW
BY
Hyde, Meyer, Baldwin & Doran
ATTORNEYS.

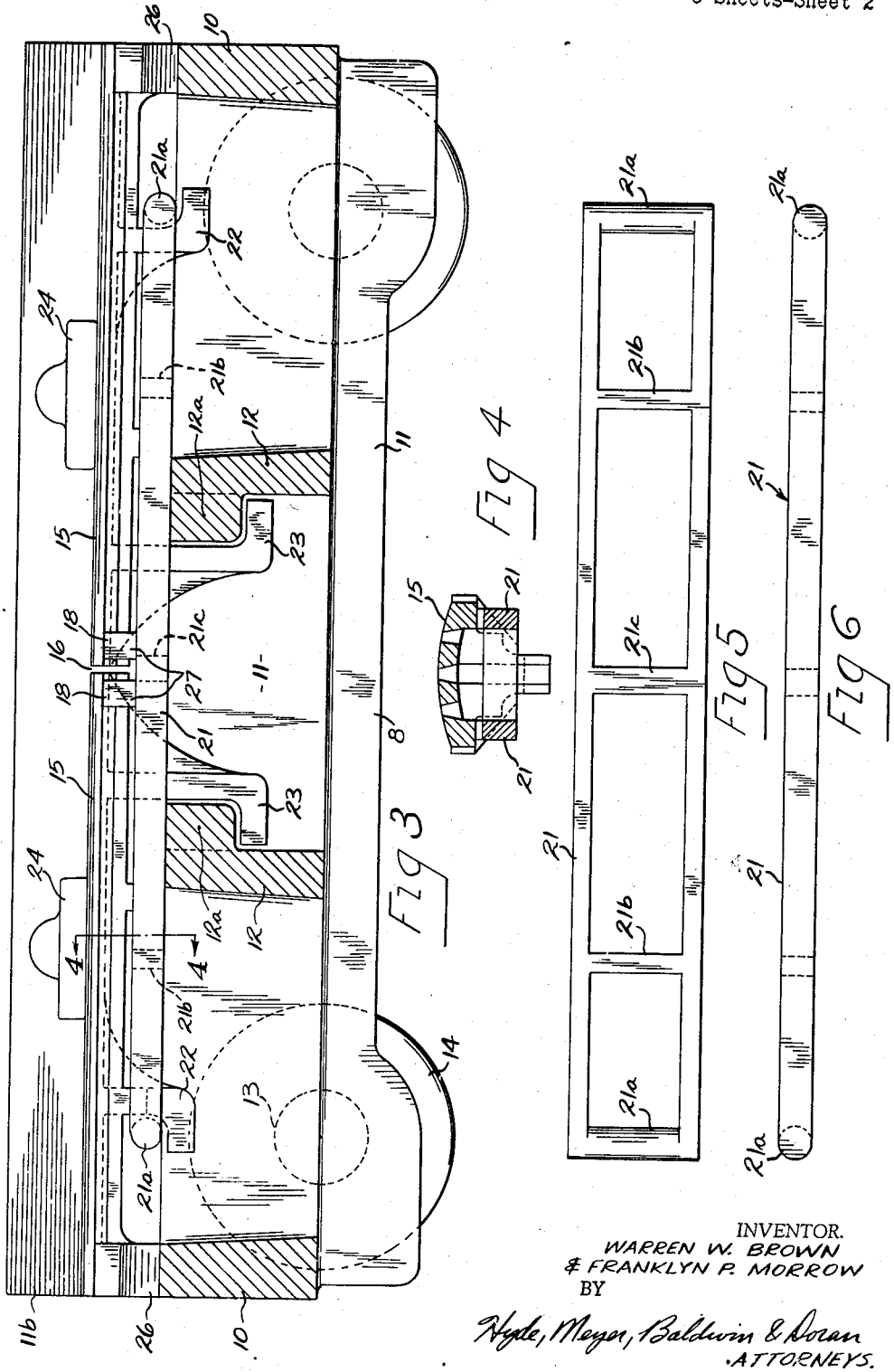

Sept. 20, 1960  W. W. BROWN ET AL  2,953,366
GRATE BAR FOR PALLET OF SINTERING MACHINE
Filed Sept. 12, 1958  5 Sheets-Sheet 3

INVENTOR.
WARREN W. BROWN
& FRANKLYN P. MORROW
BY
Hyde, Meyer, Baldwin & Doran
ATTORNEYS.

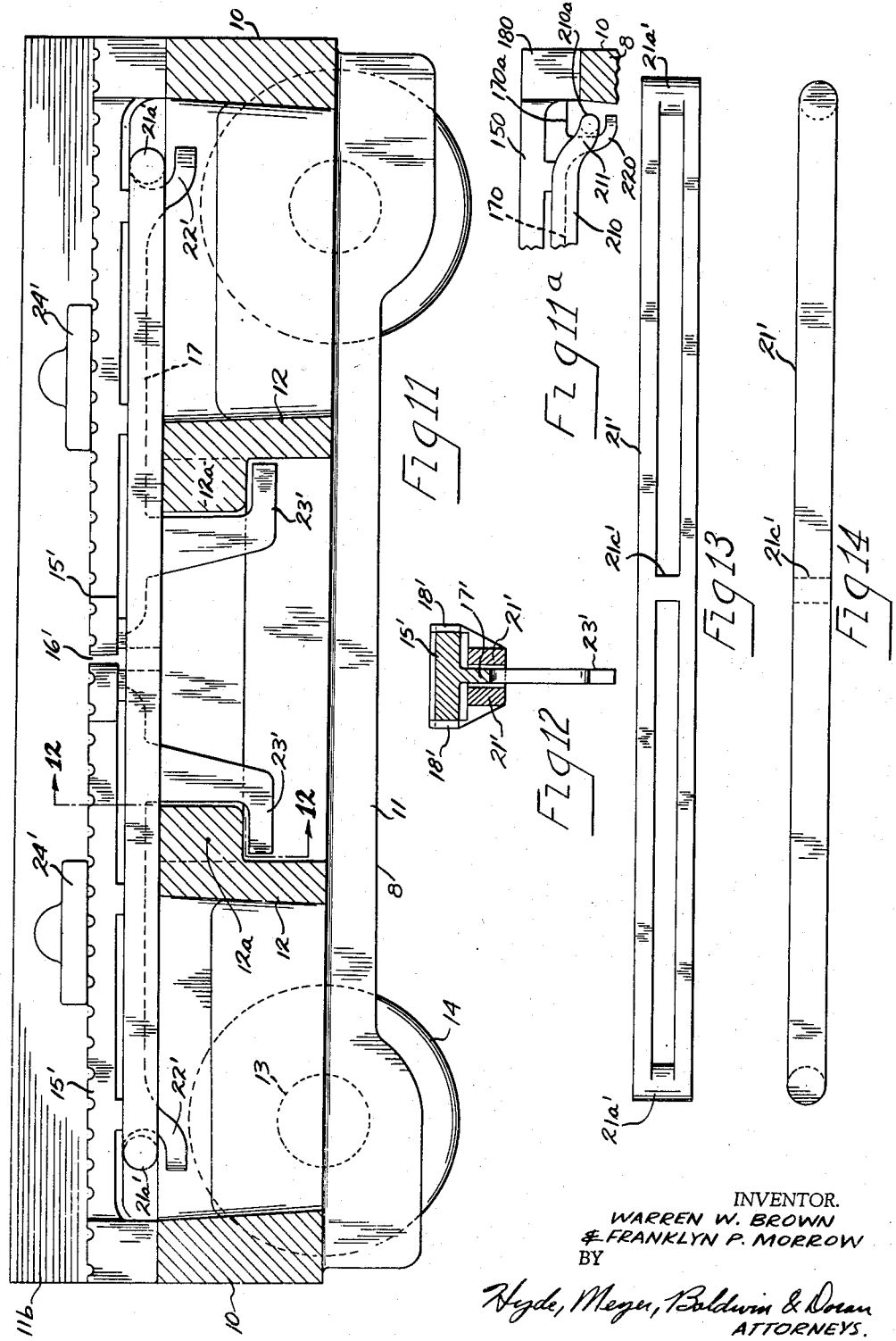

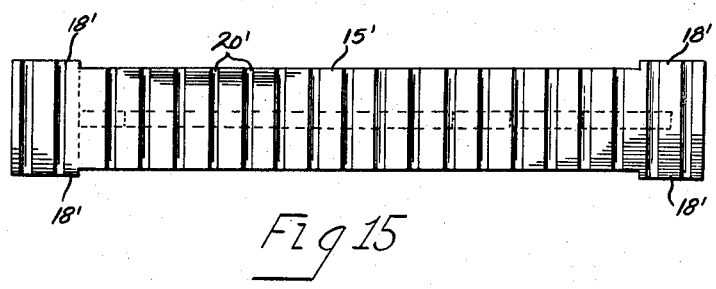
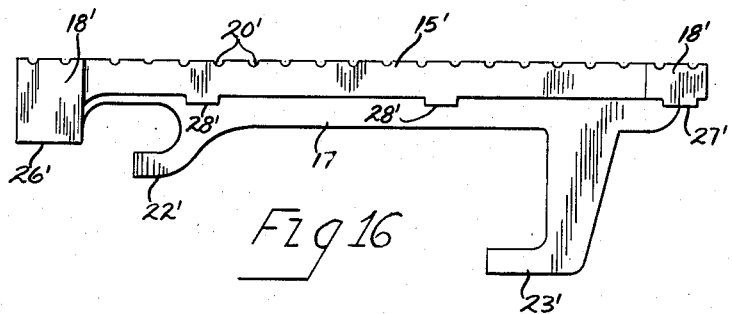
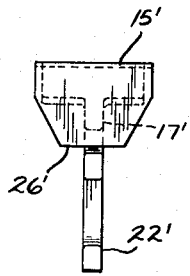
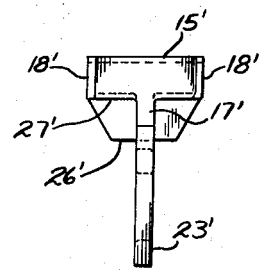

United States Patent Office 2,953,366
Patented Sept. 20, 1960

2,953,366
GRATE BAR FOR PALLET OF SINTERING MACHINE

Warren W. Brown and Franklyn P. Morrow, Cleveland, Ohio, assignors to Superior Foundry, Inc., Cleveland, Ohio, a corporation of Ohio Filed Sept. 12, 1958, Ser. No. 760,761

6 Claims. (Cl. 266—21)

This invention relates to improvements in a grate bar for use in a pallet of a sintering machine or the like and improved means for connecting and disconnecting said grate to the frame of the pallet.

One of the objects of the present invention is to make a grate bar in two pieces wherein the top bar is subjected to the greatest heat and wear and a tie bar directly beneath the top bar aids in supporting the top grate bar and in tying the same to the pallet frame. An advantage of this construction is that the top bar can be made of less material and of lighter weight so that the expensive alloy from which it is made is conserved while the tie bar may be made from a lower grade alloy or even a common cast iron or cast steel. Another advantage of this construction is that the tie bar need not be replaced as often as the top grate bar and, therefore, there is a conserving of material in maintenance and replacement.

Another object of the present invention is to provide an improvement in grate bars for a pallet frame having a predetermined length in the direction of frame travel, whereby a plurality of grate bars are provided seating on the frame and extending in the direction of frame travel, each of these grate bars being approximately half of the predetermined length of the frame and pairs of these bars being arranged in end-to-end relationship so that the grate bars do not warp as much as in the case of end-to-end grate bars and half a bar may be replaced where necessary instead of replacing an entire bar.

Another object of the present invention is to provide in the combination of the preceding paragraph, a tie bar underlying two aligned half grate bars so that the outer ends of the tie bar hold down the outer ends of the half grate bar and the entire structure is held to the pallet frame by hook members on the half grate bars which underlie portions of the pallet frame and tie the grate bars, the tie bar and the entire structure into one useful assembly.

Other objects and advantages of our invention will be apparent from the accompanying drawings and description and the essential features will be set forth in the appended claims.

In the drawings—

Fig. 1 is a top plan view of a sintering machine pallet equipped with our invention with portions broken away to more clearly show the construction;

Fig. 2 is a fragmental sectional view taken along the line 2—2 of Fig. 1;

Fig. 3 is a transverse sectional view enlarged taken along the line 3—3 of Fig. 1;

Fig. 4 is a sectional view taken along the line 4—4 of Fig. 3;

Figs. 5 and 6 are top plan and side elevational views respectively of a tie bar as shown in Fig. 3;

Fig. 11 is a transverse sectional view similar to Fig. 3 but showing a modified form of construction;

Fig. 11A is a fragmentary view similar to a portion of Fig. 11 and showing a slight modification thereof;

Fig. 12 is a fragmental sectional view taken along the line 12—12 of Fig. 11;

Figs. 13 and 14 are top plan and side elevational views, respectively, of the tie bar of Fig. 11;

Figs. 15 and 16 are top plan and side elevational views, respectively, of one of the half grate bars of Fig. 11;

Fig. 17 is an end elevational view taken at the left-hand end of Figs. 15 and 16; while Fig. 18 is an end elevational view taken at the right-hand end of Figs. 15 and 16.

Figure 7:
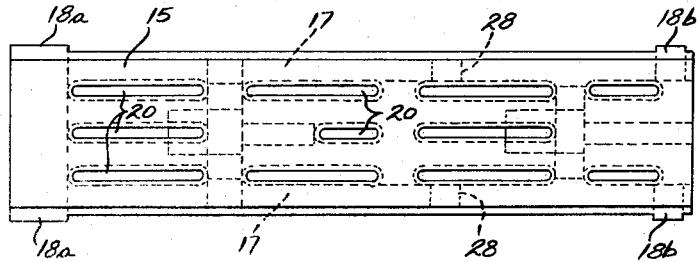
Figs. 7 and 8 are top plan and side elevational views respectively of one of the half grate bars of Fig. 3.

We have chosen to illustrate our invention as utilized in connection with a pallet of a sintering machine. In the sintering of iron ore and the like, it is customary to use a machine having a series of pallets moving upon an endless track. The ore mixed with a fuel such as coke breeze is fed onto the pallets as they move away from one end of the machine, the combustible material on the grate bars of the pallets is ignited from above and air is pulled downwardly through the material to be sintered as it passes along the machine. At the opposite end of the machine, the sintered material is automatically dumped and the pallets return along an idle run of the machine to the starting point. Typically, each pallet is approximately two feet in length in the direction of travel and often from six to twelve feet wide at right angles to the direction of travel.

We have chosen to show our invention as applied to a typical pallet 8 for use in a sintering machine as shown in Fig. 1. We designate as end members of the pallet the members 10 which extend cross-wise of the pallet at the opposite ends thereof in the direction of pallet travel. The members 11 are designated as side members and extend parallel to the direction of pallet travel. Two cross frame members 12 parallel to each other and parallel to the end members 10 are provided in an intermediate portion of the frame and serve to reinforce the same. Mutually facing reinforcing ribs 12a on the members 12 extend across the major width of the frame, but these terminate just short of the ends of the cross members 12 as indicated at 12b to provide hook-receiving openings. Preferably, these openings 12b are provided near each side of the pallet but it is conceivable that the pallet could be formed with such openings at one side only. This would be inconvenient in the case of a very wide pallet. Journaled in bosses 11a on each side member 11 are short stub shafts 13 each of which carries a flanged wheel 14 for travel along suitable guide rails in the sintering machine. The manner in which the pallet frame is mounted for movement along a machine forms no part of the present invention and is here shown only for illustration. Each side member has an upstanding skirt board construction 11b, the purpose of which is to extend above the level of the grate bars and hold the material to be sintered in place on the pallet.

Referring now to Figs. 1 through 10, a first form of our invention is shown comprising two half grate bars 15 arranged in alignment end to end and together covering substantially the full length of the pallet frame in the direction of frame travel. Preferably, a slight clearance is left between the grate bars at 16 in the center of the frame for expansion and slight movement. Preferably, but not necessarily, each of the bars 15 has one or more downwardly extending reinforcing ribs 17 extending substantially the full length of the bar and two such ribs extending along the parallel opposite sides of the bar are shown clearly in Figs. 7 and 8. Preferably also, laterally projecting bosses are provided as indicated at 18 so as to separate adjoining bars and to provide elongated slots 19 between adjoining bars as clearly shown in Fig. 1 so that air and products of combustion may pass downwardly in the manner previously indicated to promote combustion. Other suitable openings are provided as indicated at 20 through the bar to permit air and products of combustion to pass downwardly through the bar.

A tie bar 21 is used under each grate bar or under each two aligned half grate bars as clearly seen in Figs. 3 to 6 inclusive.. Each tie bar, as best seen in Figs. 5 and 6, is approximately the width as the grate bar which it underlies, but slightly less in width as seen in Fig. 4, and extends for the greater portion of the length of the two aligned half grate bars as seen in Fig. 3. Each tie bar has a cross member 21a at each end and other tie members or reinforcing members as at 21b tying the side members together against excessive warping, including a central tie member 21c.

Means is provided for tying the grate bars to the tie bar and linking the entire assembly firmly to the pallet frame. This comprises an outer hook 22 on each grate bar and an inner hook 23 on each grate bar, these hooks being preferably integrally cast with the grate bar. Each hook 22 is adapted to be hooked below one of the end cross members 21a of the tie bar. This is done by tilting up the inner end of the grate bar and pushing the hook 22 under the member 21a. Each hook 23 is adapted to engage beneath one of the reinforcing rib projections 12a previously described, this being clearly shown in Fig. 3. In order to place the parts in this position, it is necessary to hook two half grate bars 15 under their respective tie bar end members 21a and then place this entire assembly of three pieces over the openings 12b which we have previously described as hook-receiving openings in the frame members 12. Each assembly of three members can best be extended downwardly through openings 12b until the parts reach the position shown in Fig. 3, after which the assembly can be pushed laterally along the reinforcing members 12 until the bars reach their final position in the pallet.

Since the last grate bar assembly near each side member 11 is not hooked to the cross members 12, because of the hook-receiving openings 12b mentioned previously, the last grate bar assembly on each side is held in position by one or more shoes 24 which overlie the grate bar nearest the side wall so as to hug the same closely in proper assembled position. Each shoe 24 has a shank 24a which extends through the adjacent skirt board 11b and a pin 25 is driven in place so that the shoe is firmly held in the assembled position. Hence, the last grate bar assembly near each side member 11 and shoes 24 serve as means for holding the grate bar assemblies located therebetween away from hook receiving openings 12b in the assembled position in Fig. 1.

In the above described embodiment of our invention, it will be noted that portions of the half grate bars 15 overlie the tie bar 21 so that when the hook members 23 are engaged beneath the reinforcing rib projections 12a, both the grate bars and the tie bars are held in assembled position. At the same time, the cross members 21a at the opposite ends of the tie bar engage above the hook members 22 to hold the outer ends of the grate bars in position. It will be realized that when the pallet returns on the outer run of the sintering machine, the pallet is generally upside down and in that case the hooks 22 and 23 keep the grate bars from falling out of the pallet frame.

Figure 8:
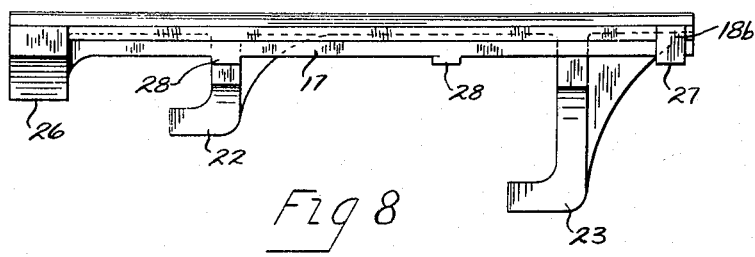
Figure 9:
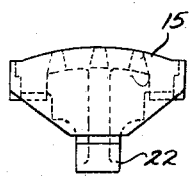
Fig. 9 is an end elevational view of the bar of Figs. 7 and 8.
Figure 10:
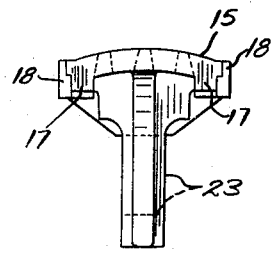
Fig. 10 is a right-hand end elevational view of the bar of Figs. 7 and 8.

It will be noted in Figs. 3 and 8 that the bosses 18a at the outer ends of the grate bars have downward extending projections 26 which rest firmly on end frame members 10 when the pallet is assembled. Also, the bosses 18b at the inner ends of the bars have downwardly extending projections 27 which rest on the parallel side bars of the tie bar 21. Other projections 28 may be provided wherever deemed necessary to rest upon the tie bar 21 so as to give a firm support to the grate bar.

Figs. 11 through 18 show another modification of our invention where the chief difference from the form already described is in the width of the grate bar. Here the individual bar is of the order of one and a half inches wide whereas in the first described form each bar was approximately three inches wide. In Fig. 11, the parts which are of the pallet which are identical with those of Fig. 3 have been given identical reference characters. The reference characters applied to the grate bars and to the tie bar have been given similar reference characters with the prime suffix to indicate parts which have the same function as similar parts in the first described form of our invention. For instance, each half grate bar 15' has a single reinforcing rib 17' on its under side extending centrally longitudinally of the grate bar. Bosses 18' are provided extending laterally from the main portion of the grate bar so that there is a long slot between adjacent grate bars extending the full length of a half grate bar between the projections 18' for the downflow of air and products of combustion. Each bar may or may not have cross grooves 20' performing the function of the openings 20 of the first described form, namely, to permit flow of air and products of combustion toward the sides of the grate bar on their passage down through the material being sintered and then down through the openings between the grate bars into the wind boxes. The tie bars 21' are analogous to the tie bars 21 except that they are not so wide but sufficient to underlie a portion of the grate bar 15' as clearly shown in Fig. 12. Each tie bar has an end cross member 21a' at each end adapted to receive the hooks 22' of the grate bars. Each tie bar has a single cross member 21c' at the center although other tie members between the parallel side bars of the tie bar might be provided. Each grate bar has an outer shorter hook 22' to engage beneath the tie bar cross member 21a', and an inner longer hook 23' adapted to rest beneath reinforcing rib projection 12a to tie the structure together. The structure of this second described embodiment of my invention functions exactly like the first described form, the chief difference being the width of the grate bar.

It should be understood that the grate bars of this second described form are inserted downwardly through hook-receiving openings 12b where the projections 12a are cut short at the ends of the cross reinforcing members 12 of the pallet frame. Then, the last grate bar assembly on each side next to the side frame members 11 is held in position by shoes 24' in every respect analogous to the shoes 24 previously described.

It should be understood that in every case it is not necessary that the tie bar 21 or 21' be straight from end to end. In Fig. 11A we have shown a slight modification of Fig. 11 wherein the grate bar 150 has a reinforcing rib 170 located centrally thereof as in Fig. 11 but extending clear out to the end block 180 so that it is necessary to bend the outermost end of the tie bar 210 downwardly as indicated at 211 to provide a cross member 210a at a lower level than the main portion of the tie bar 210. The hook member 220 then extends downwardly sufficiently from the grate bar to lie underneath the cross member 210a. Other than these specifically described changes, the form shown in Fig. 11A performs exactly like the form of our invention disclosed in connection with Figs. 11 through 18.

What is claimed is:

1. In combination, a pallet frame, a plurality of grate bars seating on said frame, a tie bar detachable from said frame and located under each grate bar, disconnectable means for locking each grate bar at a first location to its associated tie bar, and means for detachably locking each grate bar at a second location and its associated tie bar at a third location to said frame, said last named means comprising a downwardly extending hook at said second location on each of said grate bars, parts of said grate bar overlying at said third location its associated tie bar, and means on said frame at said second location overlying said hook when the parts are assembled whereby said grate bar holds said tie bar locked to said frame and each grate bar is locked directly to said frame at said second location.

2. In combination, a pallet frame, a plurality of grate bars seating on said frame, a tie bar detachable from said frame and located under each grate bar, disconnectable means for locking each grate bar at a first location to its associated tie bar, and means for detachably locking each grate bar at a second location and its associated tie bar at a third location to said frame, each of said tie bars extending substantially the full length of said frame measured in the direction of travel thereof, and each of said grate bars comprising two half-grate bars arranged in end-to-end relationship and engaging a single tie bar at said first locations.

3. In combination, a pallet frame having reinforcing rib means extending from side to side of said frame and normal to the direction of travel of said frame, projections on said rib means in the direction of frame travel, said projections terminating short of at least one side of said frame to provide a hook-receiving opening there, a plurality of grate bars seating on said frame and extending in the direction of travel thereof, a tie bar under each grate bar, each tie bar having a cross member near one end thereof, a hook on each grate bar adapted to engage beneath said cross member on its associated tie bar, a second hook on each grate bar adapted to pass downwardly through said hook-receiving opening and then to engage beneath one of said projections upon lateral movement of said bar along said rib means, parts of each said grate bar overlying its associated tie bar, and means for holding said bars away from said hook-receiving openings after said bars are assembled in said frame.

4. The combination of claim 3 wherein said projections are opposed and inwardly directed, each of said tie bars extends substantially the full length of said frame in the direction of frame travel, each of said grate bars is approximately one-half the said length of said frame, each said tie bar has a cross member at each end thereof, and two of said grate bars overlie each tie bar in end-to-end relationship.

5. In combination, a pallet frame having reinforcing rib means extending from side to side of said frame and normal to the direction of travel of said frame, projections on said rib means in the direction of frame travel, said projections terminating short of at least one side of said frame to provide a hook-receiving opening there, a plurality of grate bars seating on said frame and extending in the direction of travel thereof, a tie bar under each grate bar, each tie bar having a cross member near one end thereof, a hook on each grate bar adapted to engage beneath said cross member on its associated tie bar, and a second hook on each grate bar adapted to pass downwardly through said hook-receiving opening and then to engage beneath one of said projections upon lateral movement of said bar along said rib means, parts of each said grate bar overlying its associated tie bar.

6. The combination of claim 5 wherein said projections are opposed and inwardly directed, each of said tie bars extends substantially the full length of said frame in the direction of frame travel, each of said grate bars is approximately one-half the said length of said frame, each said tie bar has a cross member at each end thereof, and two of said grate bars overlie each tie bar in end-to-end relationship.

References Cited in the file of this patent

UNITED STATES PATENTS

| | | |
|---|---|---|
| 930,259 | Young | Aug. 3, 1909 |
| 1,327,399 | Mallinson | Jan. 6, 1920 |
| 1,670,642 | Van Brunt | May 22, 1928 |
| 1,888,348 | Hegeler et al. | Nov. 22, 1932 |
| 2,245,136 | Shallock | June 10, 1941 |
| 2,360,933 | Bunker | Oct. 24, 1944 |
| 2,465,559 | Urban | Mar. 29, 1949 |